US006714516B1

(12) United States Patent
Todd (10) Patent No.: US 6,714,516 B1
(45) Date of Patent: Mar. 30, 2004

(54) CONGESTION CONTROL MECHANISM FOR SSCOP PROTOCOL

(75) Inventor: Michael D. Todd, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/502,533

(22) Filed: Feb. 11, 2000

Related U.S. Application Data (60) Provisional application No. 60/131,954, filed on Apr. 30, 1999.

(51) Int. Cl.[7] .............................................. G01R 31/08
(52) U.S. Cl. ....................................... 370/235; 370/230
(58) Field of Search ............................... 370/230, 230.1, 370/231, 232, 233, 234, 235.1, 236, 236.1, 236.2, 237, 235, 336

(56) References Cited

U.S. PATENT DOCUMENTS

| 5,563,874 A |   | 10/1996 | Kant ............................ 370/13 |
| 5,617,409 A | * | 4/1997  | Ozveren et al. ............ 370/235 |
| 5,784,358 A | * | 7/1998  | Smith et al. ................ 370/230 |
| 6,009,078 A | * | 12/1999 | Sato ............................ 370/232 |
| 6,144,636 A | * | 11/2000 | Aimoto et al. .............. 370/229 |
| 6,356,629 B1 | * | 3/2002 | Fourie et al. ............ 379/112.1 |

OTHER PUBLICATIONS

Telecommunication Standardization; "B–ISBN ATM Adaptation Layer—Service Specific Connection Oriented Protocol (SSCOP)"; Jul. 1994; http://www.itu.int/itudoc/itu–t/rec/q/q1000up/s_q2110.htm.

Trillium Digital Systems, Inc.; "Trillium ATM Signalling White Paper"; Apr. 30, 1996; 29 pages; http://www.trillium.com/whats–new/wp_atmsig.html.

International Telecommunication Union; "B–ISDN Signalling ATM Adaptation Layer—Service Specific Coordination Function for Support of Signalling at the User Network Interface (SSFC at UNI)"; 07/94; 58 pages.

* cited by examiner

Primary Examiner—Alpus H. Hsu
Assistant Examiner—Thien D Tran
(74) Attorney, Agent, or Firm—Danamraj & Youst, P.C.; Craig A. Hoersten; V. Lawrence Sewell (57) ABSTRACT

A congestion control mechanism for use with a receiver in a telecommunications network using the Service Specific Connection Oriented Protocol (SSCOP). The receiver is disposed in an access network portion of the telecommunications network such that it receives messages from an aggregate portion of the network over an Access Network Interface (ANI) and from a plurality of users over User-Network Interfaces (UNIs) in a distribution network portion. Credit windows granted by the receiver to the transmitters for transmission of message frames are managed by the receiver when it experiences congestion. The congestion control method monitors buffer usage for ANI-based traffic and UNI-based traffic in the receiver by setting appropriate buffer use counters and timers. When the number of available buffers reaches certain predetermined threshold values, the receiver sends an indication to the transmitter to restrict its message transmit window, thereby throttling the message flow therefrom.

13 Claims, 10 Drawing Sheets

| FUNCTIONALITY | PDU NAME | PDU TYPE FIELD | DESCRIPTION |
|---|---|---|---|
| ESTABLISHMENT | BGN | 0001 | REQUEST INITIALIZATION |
| | BGAK | 0010 | REQUEST ACKNOWLEDGEMENT |
| | BGREJ | 0111 | CONNECTION REJECT |
| RELEASE | END | 0011 | DISCONNECT COMMAND |
| | ENDAK | 0100 | DISCONNECT ACKNOWLEDGEMENT |
| RESYNCHRONIZATION | RS | 0101 | RESYNCHRONIZATION COMMAND |
| | RSAK | 0110 | RESYNCHRONIZATION ACKNOWLEDGEMENT |
| RECOVERY | ER | 1001 | RECOVERY COMMAND |
| | ERAK | 1111 | RECOVERY ACKNOWLEDGEMENT |
| ASSURED DATA TRANSFER | SD | 1000 | SEQUENCED CONNECTION-MODE DATA |
| | POLL | 1010 | TRANSMITTER STATE INFORMATION WITH REQUEST FOR RECEIVE STATE INFORMATION |
| | STAT | 1011 | SOLICITED RECEIVER STATE INFORMATION |
| | USTAT | 1100 | UNSOLICITED RECEIVER STATE INFORMATION |
| UNACKNOWLEGED DATA TRANSFER | UD | 1101 | UNNUMBERED USER DATA |
| MANAGEMENT DATA TRANSFER | MD | 1110 | UNNUMBERED MANAGEMENT DATA |

| | OCTETS | | | |
|---|---|---|---|---|
| | 1 | 2 | 3 | 4 |
| 1 | RESERVED | N(PS) | | |
| 2 | RESERVED \| PDU TYPE | N(S) | | |
| | 8765  4321 | | | |

| | OCTETS | | | |
|---|---|---|---|---|
| | 1 | 2 | 3 | 4 |
| 1 | PAD | LIST ELEMENT 1 (a SD PDU N(S)) | | |
| 2 | PAD | LIST ELEMENT 2 | | |
| 3 | RESERVED | N(MR) | | |
| 4 | RESERVED \| PDU TYPE | N(R) | | |
| | 8765  4321 | | | |

| | OCTETS | | | |
|---|---|---|---|---|
| | 1 | 2 | 3 | 4 |
| 1 | PAD | LIST ELEMENT 1 (a SD PDU N(S)) | | |
| 2 | PAD | LIST ELEMENT 2 | | |
| ... | | ⋮ | | |
| L | PAD | LIST ELEMENT L | | |
| L+1 | RSVD | N(PS) | | |
| L+2 | RSVD | N(MR) | | |
| L+3 | RESERVED \| PDU TYPE | N(R) | | |
| | 8765  4321 | | | |

CONGESTION CONTROL MECHANISM FOR SSCOP PROTOCOL

PRIORITY STATEMENT UNDER 35 U.S.C. §119 (e) & 37 C.F.R. §1.78

This nonprovisional application claims priority based upon the following prior U.S. provisional patent application entitled: "Congestion Control Mechanism For SSCOP Protocol," Ser. No. 60/131,954, filed Apr. 30, 1999, in the names of: Michael D. Todd and Halim Zaim.

BACKGROUND OF THE INVENTION

1. Technical Field of the Invention

The present invention relates to telecommunications networks. More particularly, but not by way of any limitation, the present invention relates to a congestion control mechanism for use with an access multiplexer disposed in an access network portion of a telecommunications network, wherein the access multiplexer receives message flows from the network and a plurality of users.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. The second factor is the Telecommunications Reform Act, which is fostering broader competition through deregulation. The third and final factor is congestion in the Public Switched Telephone Network (PSTN), originally designed and developed for voice-only traffic.

There have been several important advances in telecommunications technology that enable high rates of throughput in carrier networks backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access are beset by the limitations of the existing twisted-pair copper cable infrastructure provided between a carrier's central office (CO) and a subscriber's remote site, typically referred to as the local loop. In the telecommunications art, these limitations are sometimes collectively described as the "last-mile" problem.

Current advances in technology are making it possible to get more bandwidth from the existing twisted-pair copper cable infrastructure. One of these developments is the Digital Subscriber Line (DSL) technology which utilizes the local loop telephone wiring already installed to virtually every home and business in the world, but does not depend on the rest of the PSTN infrastructure.

DSL is a modem technology for converting existing twisted-pair telephone lines into access paths for multimedia and high-speed data communications. Some versions of this technology are asymmetric, with different data rates in the downstream and upstream directions (to and from the subscriber, respectively). Others are symmetric, providing the same data rate both upstream and downstream. Regardless of the version, DSL technology provides three distinct advantages: (i) separation of voice and data communications, (ii) ability to implement the technology incrementally and inexpensively, and (iii) effective utilization of the open market place created by local loop deregulation.

An Asymmetric Digital Subscriber Line (ADSL) circuit connects an ADSL modem on each end of a twisted-pair telephone line, creating three information channels—a high speed downstream channel, a medium speed duplex channel, and depending on the implementation of the ADSL architecture, a Plain Old Telephone Service (POTS) or an Integrated Services Digital Network (ISDN) channel. The POTS/ISDN channel is split off from the digital modem by filters, thus guaranteeing uninterrupted POTS/ISDN connectivity, even if ADSL fails. The high speed channel ranges from 1.5 to 6.1 Mbps of throughput, while duplex rates range from 16 to 640 kilobits per second (Kbps).

With the deployment of DSL technologies for remote access, it is now possible to establish end-to-end broadband connectivity over packet-switched networks such as ATM networks. As is well known, one of the characteristics of ATM networks is that they are connection-oriented, that is, before two end systems can communicate they need to establish a connection between them. However, unlike circuit-switched networks (e.g., the Public Switched Telephone Network or PSTN), the connection between the two end points does not consume a fixed bandwidth. Instead, bandwidth is allocated statistically, so that a large number of connections can share the bandwidth of individual links in the network. Since these connections are not dedicated bandwidth channels, they are typically referred to as "virtual channel connections" (VCCs) or "virtual circuits" (VCs).

VCCs between two ATM endpoints can be established in one of two ways. In the provisioning method, the virtual circuits are permanently configured and left in place until the subscribers want them to be removed. Accordingly, such circuits are known as permanent virtual circuits (PVCs). Typically, no special signaling protocol is necessary to handle control signaling (e.g., set-up and tear-down) of the PVCs. On the other hand, virtual circuits can also be established on demand and such circuits are called switched virtual circuits (SVCs). These SVCs are created and destroyed dynamically as needed and, accordingly, require a signaling protocol for exchanging messages necessary to set up and tear down SVC connections. Such a protocol, known as Service Specific Connection Oriented Protocol (SSCOP) has been specified in the ATM Adaptation Layer (AAL) for effectuating the Broadband ISDN (B-ISDN) signaling architecture in ATM networks. The SSCOP is defined by the ITU as ITU-T Recommendation Q.2110 and is incorporated by reference herein.

The SSCOP provides connection control and governs the message transmission process between a receiver and a transmitter disposed in an SVC. In the context of the ADSL technology, an access multiplexer—which is provided as a node that concentrates a plurality of ADSL lines from users (i.e., customer premises equipment or CPE) and is coupled to the carrier network via a Point of Presence (POP) switch—operates as an SSCOP receiver for traffic emanating from the users as well as the network itself.

Those skilled in the art should appreciate that the access multiplexer node can experience heavy amounts of signaling traffic from the users, the network, or both, and, accordingly, its resources (i.e., processor resources, buffer availability, etc.) may become overloaded. Although the SSCOP provides a flow control mechanism by way of a credit window that is granted by the receiver to the transmitter, there are certain deficiencies and drawbacks associated therewith.

First, the SSCOP Recommendation does not specify how the credit window needs to be managed by the receiver when the receiver experiences traffic overload, i.e., congestion.

While the receiver can update a message sequence indicator that is transmitted back to the transmitter to indicate the highest number of messages it can accept, the Recommendation provides that the updating procedure is implementation-specific and not subject to standardization. Accordingly, there is a need to address the issue of credit window management in the context of congestion in a receiver.

Second, the SSCOP treats every call or user equivalently without taking into account whether some users/calls use up the resources more rapidly than others. In other words, some users may be sending message packets fast enough to tie up the resources unfairly. Accordingly, the resources of a receiver may be overloaded due to an imbalance of the loading itself, and the SSCOP does have any precautions against such unequal use patterns.

Based on the foregoing, it should be apparent that in order to address these and other problems of the state of the art set forth above, what is needed is a congestion control solution for use with receivers operating a communication protocol such as the SSCOP that advantageously offers a mechanism for throttling message flows from transmitters based on the overload conditions. It would be of further advantage to provide a congestion control method that is capable of isolating malfunctioning users by restricting their credit window sizes. The present invention provides such a solution.

SUMMARY OF THE INVENTION

Accordingly, the present invention advantageously provides a congestion control mechanism for a Digital Subscriber Line Access Multiplexer (DSLAM) module (also referred to as an ADSL Access Multiplexer (ASAM) module) wherein message flows from transmitters (either a network portion or a plurality of CPE units) are monitored with respect to buffer usage in the DSLAM module and when certain buffer use counters reach predetermined values, an indication is provided to the transmitters such that their message transmit windows are dynamically controlled. The message flow emanating from the transmitter that consumes buffers rapidly in the receiver, i.e., the DSLAM module, is consequently throttled so as to reduce congestion in the receiver.

In one aspect, the present invention is directed to a congestion control method for managing message flow between a transmitter and a receiver disposed in a telecommunications network. The method commences by initializing, in the receiver, a buffer count variable associated with a common buffer pool (CBP) allocated for effectuating a communication protocol in the receiver. When messages from the transmitter are received in the receiver, the buffer count variable associated with the CBP is decremented appropriately. The receiver maintains a message sequence indicator that is transmitted back to the transmitter to indicate the next message in the sequence that the receiver can accept (i.e., the transmit window of the transmitter). When the buffer counter variable is above a select minimum value, the receiver updates the message sequence indicator and transmits it to the transmitter. When the buffer counter variable reaches the minimum value, the message sequence indicator is not incremented (i.e., it is held constant) until the buffer counter variable associated with the CBP attains a predetermined threshold value due to buffer releases, etc. Thereafter, the message sequence indicator in the receiver is updated normally in response to the messages received from the transmitter. Consequently, by throttling the updating of the message sequence indicator which is transmitted from the receiver to the transmitter, the message transmit window associated with the transmitter is dynamically controlled.

In another aspect, the present invention is directed to a congestion control method for throttling message flows emanating from a plurality of users (i.e., CPEs coupled with User-Network Interfaces or UNIs). A DSLAM module is provided as a receiver in an access network portion of the telecommunications network. The congestion control method begins by initializing, in the receiver, a buffer credit pool for each CPE unit, wherein the buffer credit pool corresponds to a maximum number of messages that may be transmitted by a CPE unit in a first select time period. The buffer credit pool is decremented responsive to the messages received in the receiver from a select CPE unit corresponding thereto. If the number of messages transmitted from the select CPE unit remains below its buffer credit pool, a message sequence indicator in the receiver is incremented responsive to the messages sent by the select CPE unit until the buffer credit pool is re-initialized by the receiver at the expiration of the first select time period. Otherwise, if the messages transmitted from the select CPE unit exhaust the buffer credit pool therefor, the message sequence indicator is incremented by an iterative variable for every second select time period, until the iterative variable reaches a maximum value. Thereafter, the buffer credit pool is reinitialized by the receiver at the expiration of the first select time period. The congestion control method transmits back the message sequence indicator from the receiver to each CPE unit so as to dynamically control its message transmit window.

In a presently preferred exemplary embodiment of the present invention, the messages are transmitted from the telecommunications network over an Access Network Interface (ANI) disposed between the DSLAM and the network, or from the CPEs over UNIs, and relate to the control signaling of Service Specific Connection Oriented Protocol (SSCOP) for effectuating the Signaling ATM Adaptation Layer (SAAL) standard.

In yet further aspect, the present invention is directed to a congestion control system for use in a DSLAM module disposed between a distribution channel portion and an aggregate channel portion of a telecommunications network. The DSLAM module receives messages from the aggregate channel portion over an ANI and from a plurality of CPE units over UNIs in the distribution channel portion. The DSLAM module is provided with a common buffer pool of a plurality of buffers for effectuating a communication protocol therein. The congestion control system comprises a structure for monitoring incoming messages over the ANI and the UNIs, wherein the incoming messages consume the plurality of buffers in a predetermined fashion. A message sequence indicator is provided in the congestion control system for indicating to a transmitter to decrease the transmitter's transmit window when a variable associated with available common buffer pool reaches a select value. The transmitter may comprise the aggregate channel portion of the telecommunications network or one of the CPE units. A structure is provided to update the message sequence indicator when messages are received in the DSLAM, wherein the updating structure includes a buffer use counter for messages received over the ANI and a plurality of credit counters associated with messages received over the UNIs. The message sequence indicator is updated based on the contents of the buffer use counter or the plurality of credit counters.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
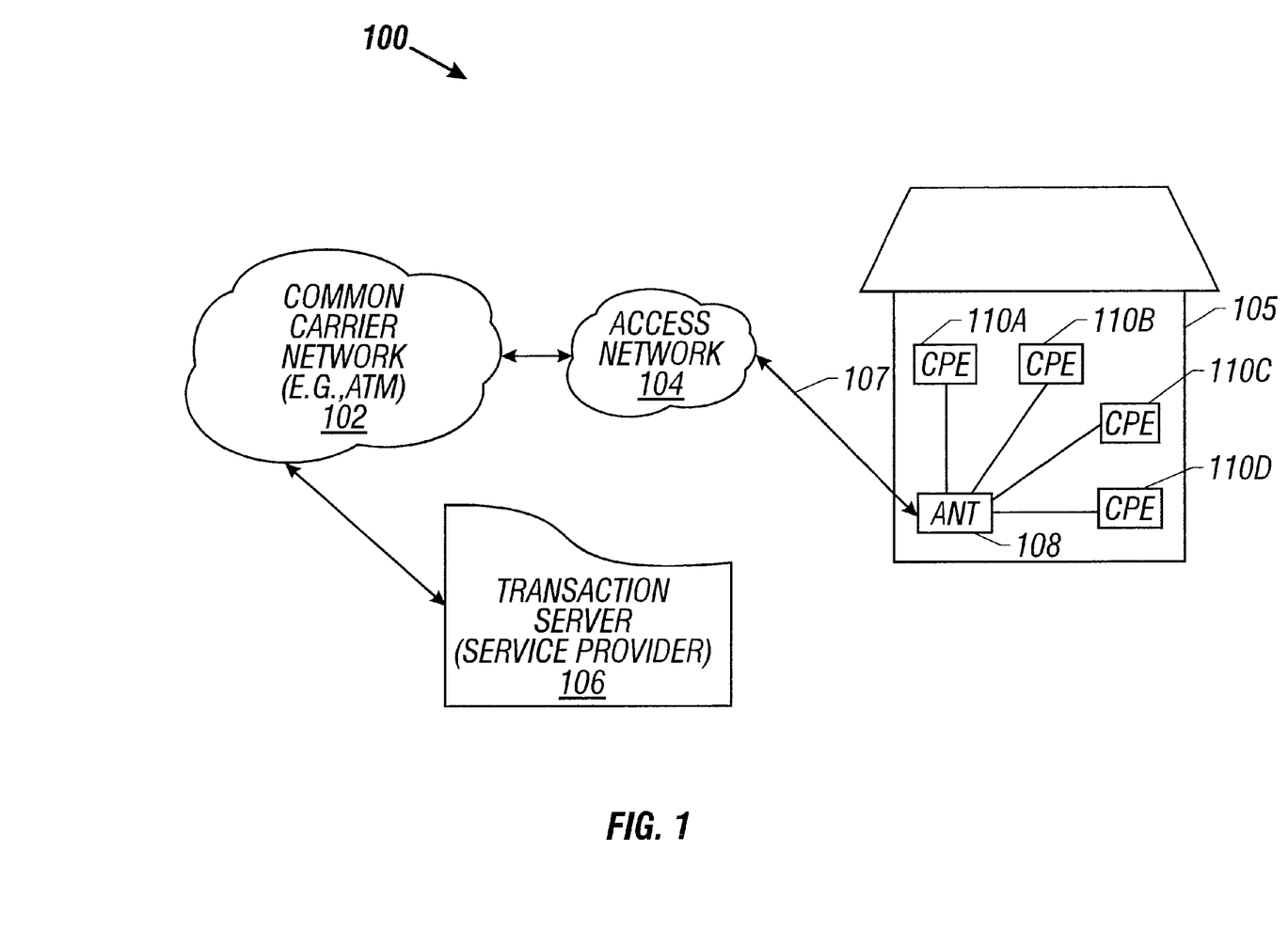
FIG. 1 depicts an exemplary embodiment of a telecommunications network having an access network portion wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary telecommunications network 100 having an ADSL access network portion 104 that is provided between a high-speed common carrier network 102 such as an ATM network core (i.e., "backbone") and customer premises 105. A transaction server 106, coupled to the common carrier network core 102, is illustrative of a service provider with respect to various services that may be accessed via one or more customer premises equipment (CPE) units, e.g., 110A–110D, provided at the customer premises 105.

Those skilled in the art should readily appreciate upon reference hereto that the telecommunications network 100 of FIG. 1 is illustrative of a network that provides a bidirectional end-to-end ATM connection using ADSL access network architecture. Accordingly, although not shown in this FIG. explicitly, it should be understood that the access network portion 104 preferably comprises DSL Access Multiplexers (DSLAM modules) (which are also sometimes referred to as ADSL Access Multiplexers or ASAMs) for concentrating a plurality of ADSL lines (e.g., line 107) into a single, broadband ATM connection , units with POTS splitter functionality, Line Terminal (LT) functionality, SONET/SDH Network Terminations (NTs), etc. As is well known, the POTS splitter units are connected to the PSTN to allow the use of the POTS service. Furthermore, the ADSL channels and the POTS service are typically Frequency Division Multiplexed (FDM) on a twisted pair of wires to the customer premises 105 (e.g., a subscriber's home or office, etc.).

An ADSL Network Termination (ANT) 108 provided at the customer premises 105 contains a POTS splitter to mux and de-mux the ADSL channels and the POTS service. Also, the ADSL signals (carrying, for example, ATM cells) are modulated/demodulated by the ANT 108. The ATM cells may be received from or sent to a CPE unit such as, e.g., a Set Top Box (STB), for accessing an Interactive Video-on-Demand (IVOD) service, et cetera. In addition, the ATM cell traffic may be used in connection with another CPE unit, e.g., a computer (which can be a personal computer, a laptop computer, a notebook computer, or a hand-held computer, and the like), for a data service such as an Internet-based service. The ADSL LT module in the access network portion 104 and the ANT 108 comprise a Discrete Multi-Tone (DMT) transceiver and are sometimes referred to as ADSL Termination Unit-Central (ATU-C) and ADSL Termination Unit-Remote (ATU-R), respectively.

Within the customer premises 105, connections between the ANT 108 and the CPE units may be effectuated using an ATM-compliant physical medium interface (operating at 25.6 Mbps, for example) or an Ethernet interface. Accordingly, the ANT 108 may be provided as a "multi-drop" module capable of connecting to multiple CPEs (as illustrated in FIG. 1) or as a modem device coupled to a single CPE unit.

Figure 2:
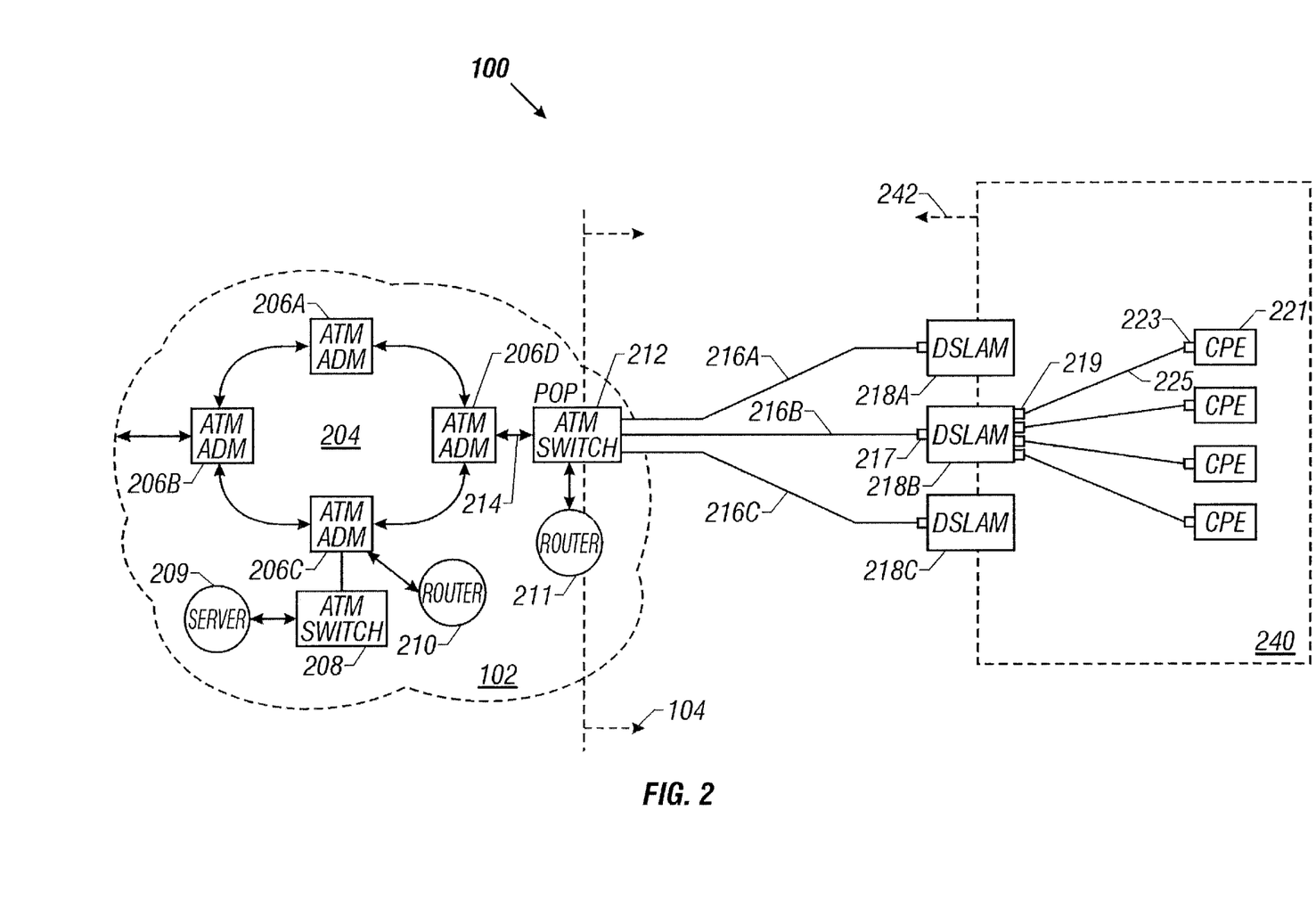
FIG. 2 depicts the telecommunications network shown in FIG. 1 in greater detail.

FIG. 2 depicts the telecommunications network 100 in greater detail. The high-speed common carrier network 102 is preferably provided as a SONET or related SDH ring 204 formed from a plurality of ATM Add/Drop Multiplexers (ADM), for example, ADM 206A–206D. Other network elements, such as server 209, routers 210 and 211, and ATM switches 208 and 212 are interconnected within the SONET ring 204. The ATM switch 212 is disposed within the common carrier network 202 as a Point Of Presence (POP) node for providing access to and from the access network portion 104. The POP ATM switch 212 is preferably connected to a SONET ATM/ADM module, for example, ATM/ADM 206D, via a high-speed link 214 capable of throughput in the order of several megabits per second. For example, the high-speed link 214 may be implemented to transport an Optical Carrier 12 (OC-12) optical signal operating at around 622.080 Mbps.

Continuing to refer to FIG. 2, the POP ATM switch 212 is connected to a plurality of DSLAM modules by way of high-speed channels, preferably capable of transporting a host of broadband signals, e.g., Optical Carrier 3 (OC-3) optical signal operating at around 155.52 Mbps. For example, DSLAM 218A, DSLAM 218B, and DSLAM 218C are connected by way of channels 216A–216C, respectively, to the POP ATM switch 212. Each DSLAM module is provided with an Access Network Interface (ANI) for inter-operably coupling with the ATM switch 212 to effectuate the high-speed channel between the DSLAM module and the ATM switch. For example, the DSLAM module 218B is provided with ANI 217B in order to effectuate the channel 216B. In addition, each DSLAM module is also provided with a plurality of LT modules, e.g., LT module 219, such that the DSLAM module can be connected to multiple CPE units, each of which is provided with a suitable User-Network Interface (UNI). As exemplified in FIG. 2, the DSLAM module 218B is connected via a twisted-pair line 225 to the CPE unit 221 having UNI 223. It should be apparent that individual NT modules for the CPE units are not explicitly shown in this FIG.

Those skilled in the art that should appreciate that the DSLAM modules, as critical components of the ADSL access network portion 104, are disposed between an aggregate network portion 242 capable of transporting broadband signals and a distribution portion 240 that is comprised of a plurality of distribution channels effectuated over twisted-pair lines for carrying lower bandwidth signals to subscribers' premises (homes, offices, etc.). Accordingly, the DSLAM modules receive message traffic originating from the aggregate network portion in one direction as well as traffic emanating from the multiple CPE/UNIs in the other direction.

Figure 3:
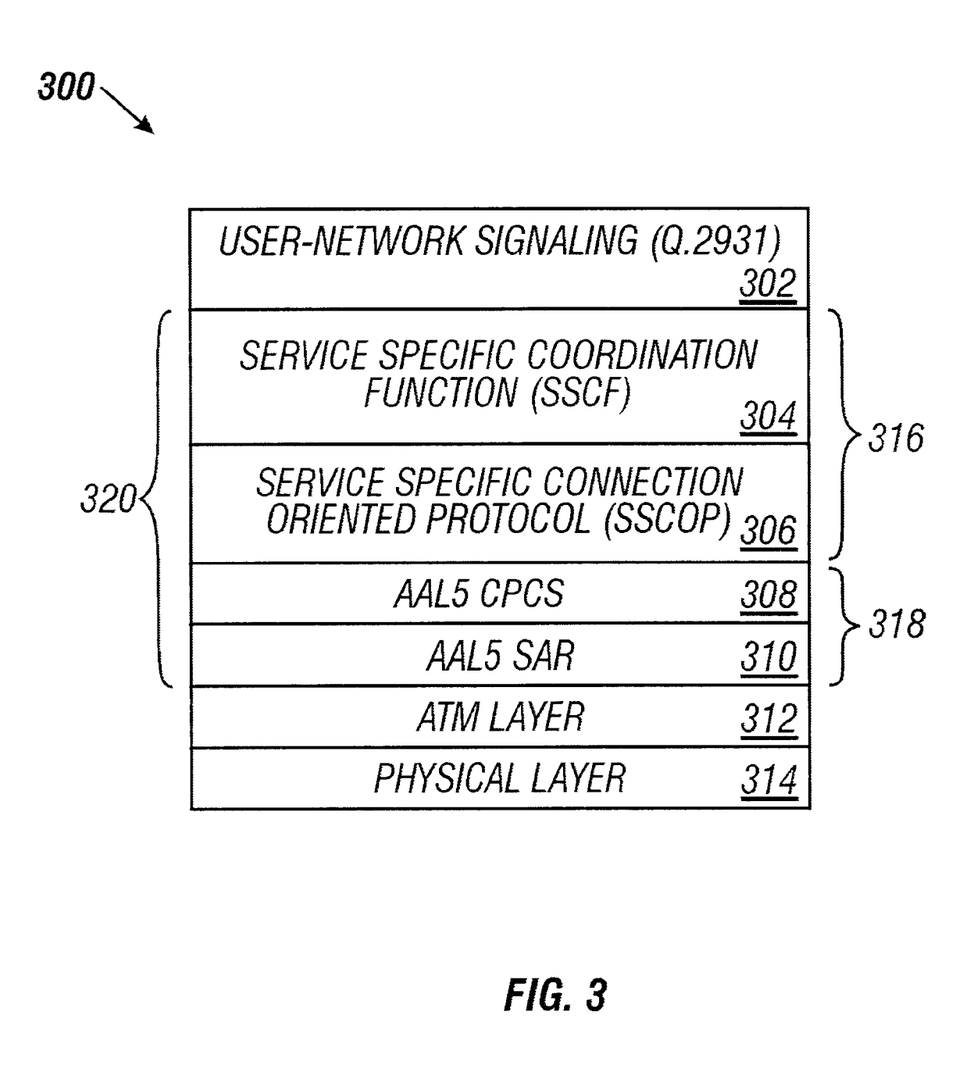
FIG. 3 depicts a protocol stack for Broadband ISDN (B-ISDN) signaling structure which employs the Signaling ATM Adaptation Layer (SAAL) standard used for exemplifying the teachings of the present invention.

FIG. 3 depicts a protocol stack 300 for effectuating a B-ISDN ATM Adaptation Layer (AAL) signaling structure in a telecommunications network such as the network 100 described hereinabove. Because the teachings of the present invention are particularly exemplified within the context of the various messages of a communication protocol forming a portion of this signaling structure, a brief description thereof is set forth immediately hereinbelow.

At the bottom of the protocol stack 300, a physical layer 314 is provided for the physical transport of the signals including control signals and user payload signals. An ATM layer 312 is provided on top of the physical layer 314 that parses information into ATM cell traffic for appropriate VCCs. A user-network signaling layer 302 is provided on top of the protocol stack 300 as a signaling layer 3 to establish end-to-end connections. The signaling layer 302 is used for communications between two signaling peer entities in the network across an ATM link, and a chain of such peer entities are typically involved in setting up an end-to-end connection. The functionality of the user-network signaling layer 302 is standardized as a Recommendation from the International Telecommunications Union (ITU-T Recommendation Q.2931) which is incorporated by reference herein.

Between the user-network signaling layer 302 and the ATM layer 312, a Signaling AAL (SAAL) 320 is disposed for providing adaptation between the signaling layer's Protocol Data Units (PDUs) and ATM cells. The SAAL 320 thus operates as a layer 2 (i.e., link layer or layer-2 of the layered architecture of Open Systems Interconnection or OSI) in the B-ISDN signaling structure, and is comprised of a SAAL Service Specific Part 316 and a SAAL Common Part 318. The SAAL Common Part 318 sits above the ATM layer 312 and includes two sub-layers which preferably relate to a particular type of AAL. As is well known, the AAL is defined as a protocol adaptation layer for enhancing the services provided by the ATM layer to support the functionality required by a higher layer in a protocol stack. Different AALs support various protocols to suit the different needs of a range of AAL service users. For example, AAL5 Segmentation and Reassembly (SAR) 310 illustrated in FIG. 3 sits above the ATM layer 312 as one of the two sub-layers of the SAAL Common Part 318, and segments its Service Data Units (SDUs) into 48-byte ATM cell payloads on transmission, and reassembles ATM cells into SDUs on reception. A Common Part Convergence Sub-layer (CPCS) 308 is provided as the second sub-layer of the SAAL Common Part 318, which sits on top of the SAR sub-layer 310 and performs various tasks such as alignment, cyclic redundancy checks (CRC), etc. The SAAL Service Specific Part 316, provided between the user-network signaling layer 302 and the SAAL Common Part 318, is comprised of a Service Specific Coordination Function (SSCF) 304 and a sub-layer whose functionality is standardized as the Service Specific Connection Oriented Protocol (SSCOP) 306.

Typically, SAR and CPCS sub-layers are implemented in the hardware (such as, e.g., the SAR device). The functions of the ATM and physical layers are also in the hardware. The SSCOP and SSCF sub-layers are usually implemented as software modules. All SAAL's layer 2 functions are accessed by signaling through a Service Access Point (SAAL-SAP). The SSCF 304 maps the services provided by the SSCOP to the needs of the user of the SAAL (i.e., layer 3). This structure allows a common connection oriented protocol with error recovery (i.e., the SSCOP) to provide a generic reliable data transfer service for different AAL interfaces defined by the SSCF. The ITU Recommendation Q.2130 defines an SSCF for signaling at the UNI and is incorporated by reference herein. The SSCOP, on the other hand, provides the mechanisms for the establishment, release, and monitoring of signaling information exchange between two peer signaling entities. At one entity, the SSCOP receives SDUs of different lengths from a signaling layer, forms PDUs therefrom, and transfers them to the peer SSCOP at the other entity. The peer SSCOP converts the PDUs to their constituent SDUs and passes them to its signaling layer.

The functionality of the SSCOP as a peer-to-peer protocol includes the following:

transfer of user data with sequence integrity;
error correction by selective retransmission;
flow control;
connection control;
error reporting to layer management;
connection maintenance (keep alive messaging);
local data retrieval;
error detection of protocol control information (PCI); and
status reporting.

The flow control functionality of the SSCOP provides a simple mechanism by which an adjustable transmit message window can be established between a receiver and a transmitter. The receiver grants a transmit message window (also referred to as a credit window) to the transmitter that allows it to transmit a certain number of frames. Although the SSCOP includes flow control functionality between two entities, there exist numerous deficiencies and drawbacks in the scheme as explained in the Background section of the present patent application.

Figure 4A:
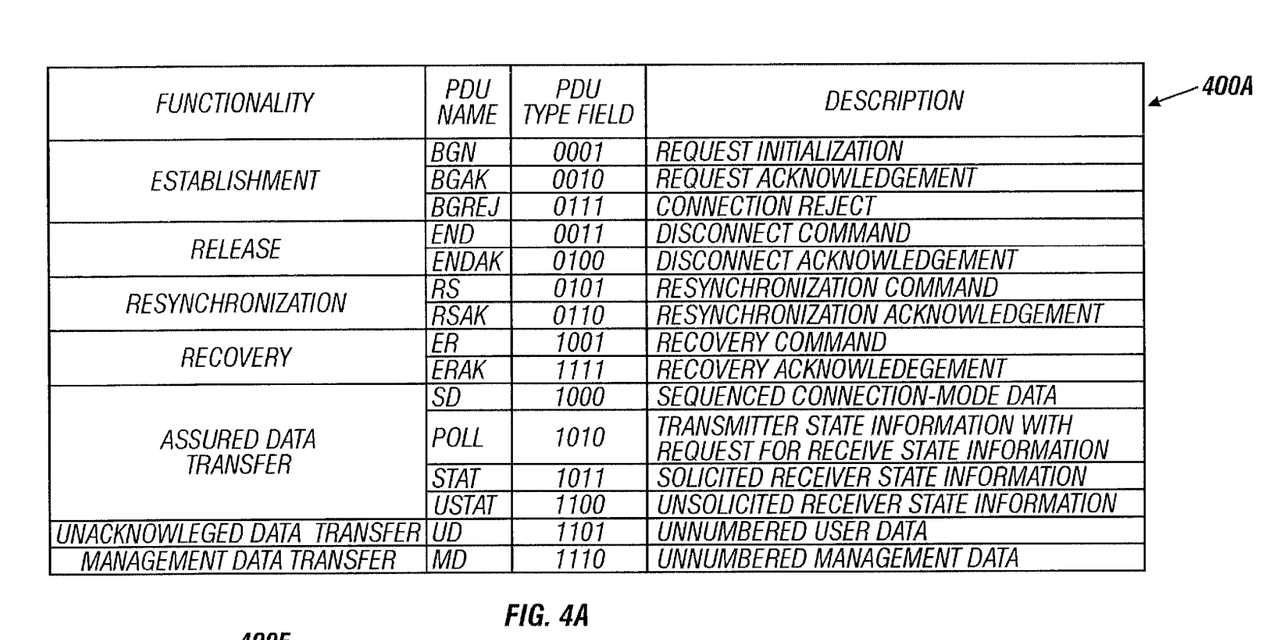
FIG. 4A depicts a table which lists the various Protocol Data Units (PDUs) used in Service Specific Connection Oriented Protocol (SSCOP) for effectuating the SAAL standard.
Figure 4B:
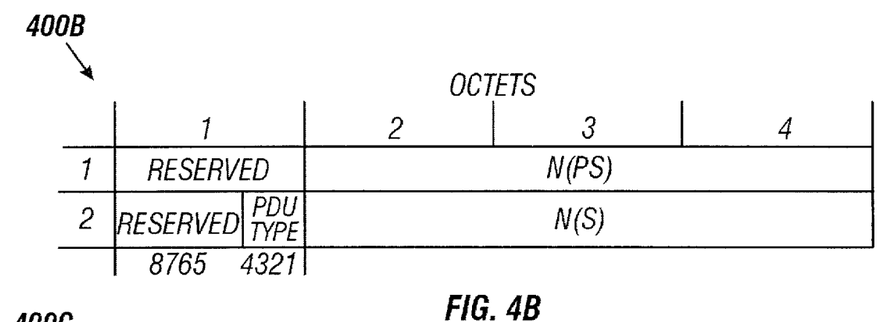
FIGS. 4B–4E depict frame formats of POLL, USTAT, STAT, and SD PDUs.

In accordance with the SSCOP, information transfer (including control signaling for connection setup and teardown, and user payload transfer) is effectuated by means of a variety of message frames or PDUs between receivers and transmitters. FIG. 4A depicts a table 400A wherein these PDUs are listed and grouped by their functionality. Relevant to the teachings of the present invention are the PDUs grouped under the Assured Data Transfer functionality, namely, SD (Sequenced Data), POLL, STAT and USTAT PDUs. FIGS. 4B–4E depict the framing format of these PDUs. A POLL PDU 400B is a PDU that is periodically sent by a transmitter to its receiver to request feedback therefrom. In each POLL PDU (or, interchangeably, frame), there is a sequence number field N(S) that shows the sequence number of the next SD PDU and a poll sequence number field N(PS) indicating the number of the next POLL frame. The N(PS) field may also be used as a time-stamp because of the periodic nature of the POLL frames.

Figure 4C:
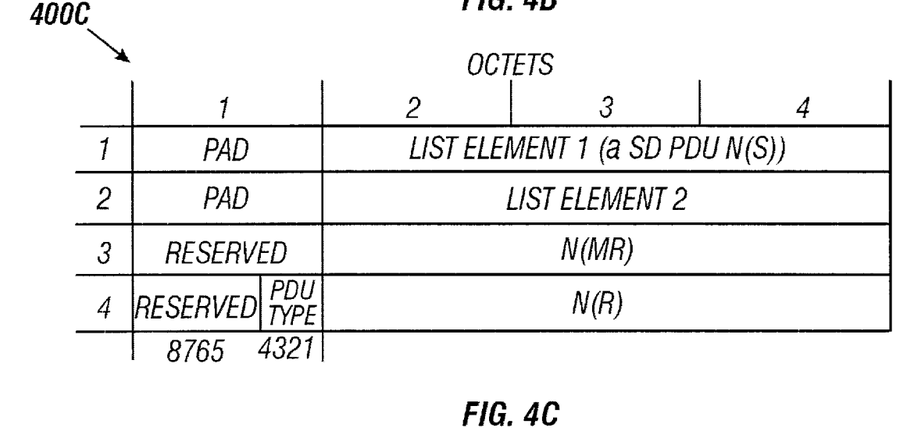
Figure 4D:
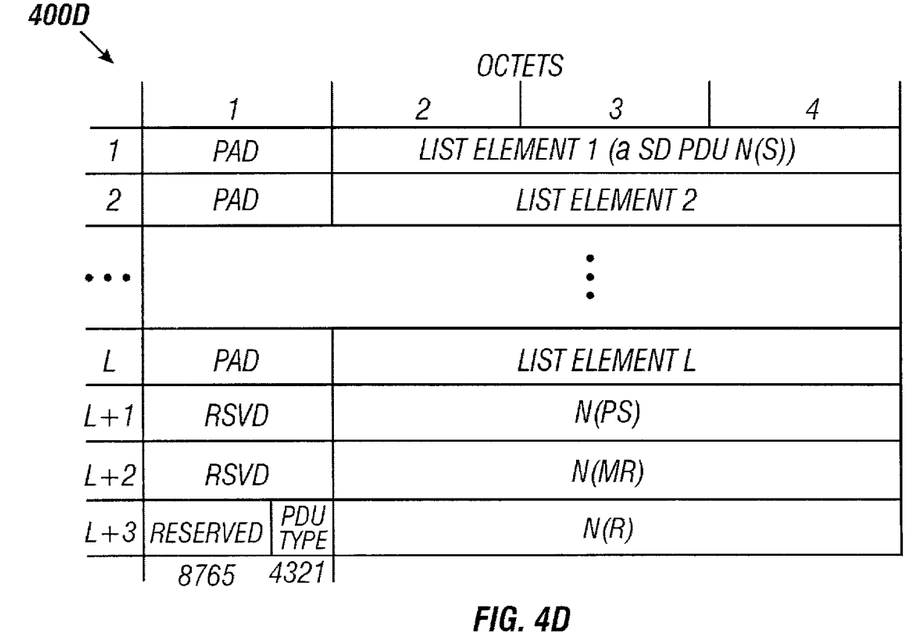

The receiver can respond to its transmitter in one of two ways: (i) by sending an Unsolicited Status or USTAT PDU 400C, or (ii) by sending a Solicited Status or STAT PDU 400D in response to a POLL frame from the transmitter. These PDUs contain, among other fields, N(R) and N(MR) fields which are mapped to VR(R) and VR(MR) state variables at the receiver, respectively. The VR(R) state variable corresponds to the sequence number of the next in-sequence SD frame that is expected to be received and is incremented upon receipt of the next in-sequence SD frame. The VR(MR) state variable corresponds to the sequence number of the first SD frame not allowed by the receiver, that is, the receiver will receive SD frames having sequence numbers up to VR(MR)—1. The STAT PDU 400D also contains the echoed poll sequence N(PS) and a list of all currently outstanding SD frames (in List element fields).

Because of the sequence integrity that is maintained between the receiver and the transmitter by way of the aforementioned PDU fields, when a message (i.e., an in-sequence SD frame) is lost or damaged, the receiver becomes aware of the situation by checking the sequence numbers of the incoming frames, and preferably sends a USTAT frame immediately, requesting the retransmission of the missing frame.

Figure 4E:
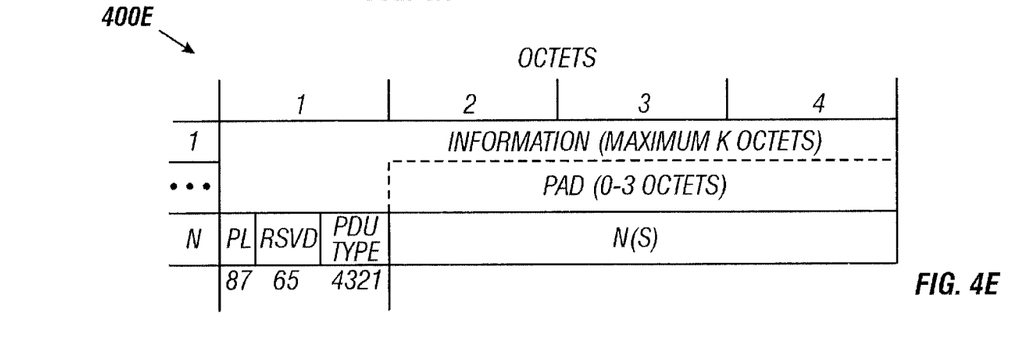

SD frames or PDUs (e.g., SD 400E) are used for transferring information which can be user payload (i.e., bearer traffic) or data pertaining to signaling. In general, the length of an SD frame is variable, containing up to 65,535 bytes. The SD frame 400E also includes the N(S) field for indicating its sequence number in a message sequence.

Figure 5:
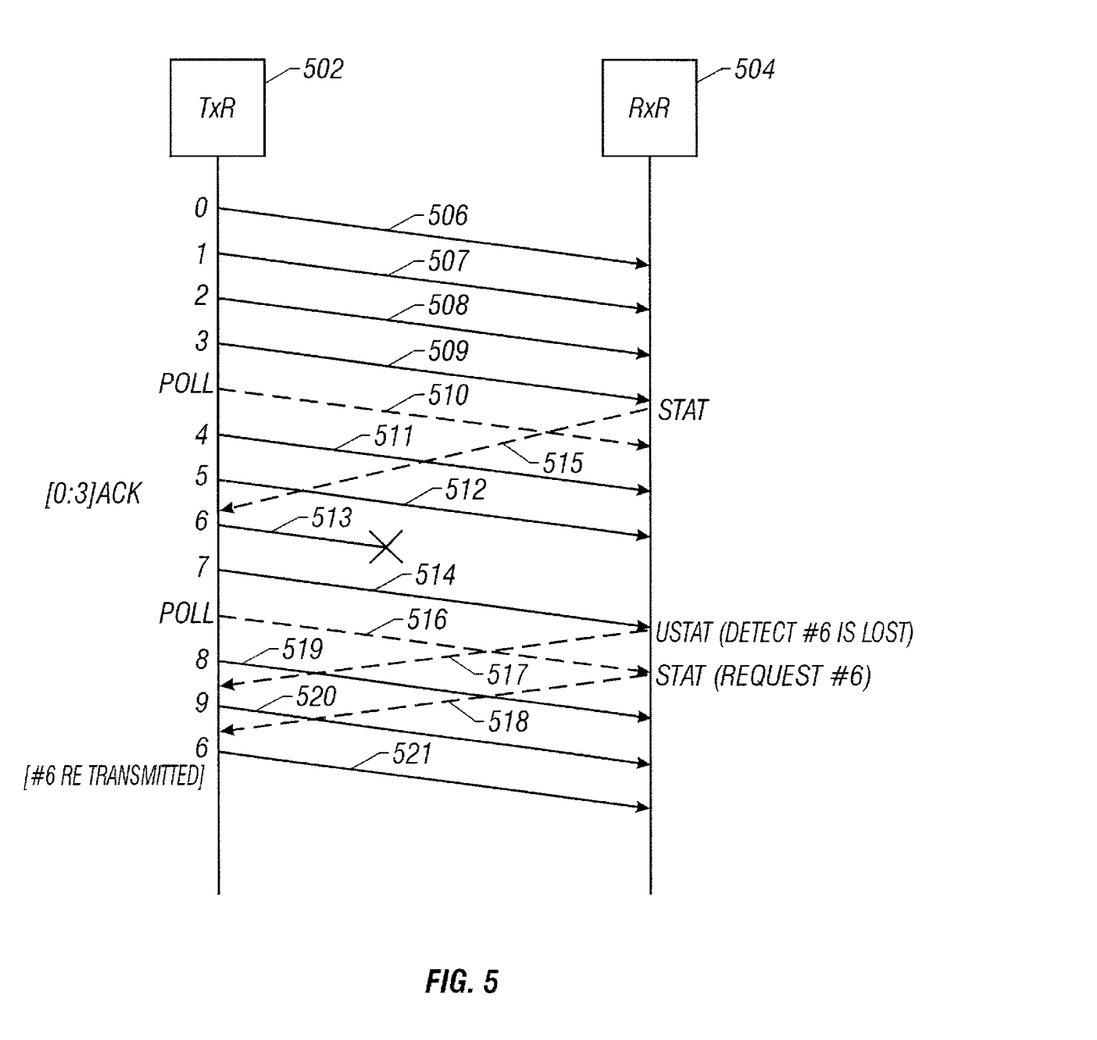
FIG. 5 is a message flow diagram illustrating the general message transmission operation between a transmitter and a receiver in accordance with SSCOP.

FIG. 5 is a message flow diagram which depicts in greater detail the basic message transfer mechanism of the SSCOP between a transmitter 502 and a receiver 504. Upon transmitting four SD [0:3] frames 506–509, the transmitter sends a POLL frame 510 to the receiver 504. In response thereto, the receiver replies by sending a STAT frame 515 in a normal manner. The transmitter 502 acknowledges the successful receipt of the SD frames [0:3] in the receiver and, thereafter, may preferably release buffers used for message queuing. The received messages are also placed in a buffer queue in the receiver for facilitating the processing of them upstream in the protocol stack of the SAAL. Accordingly, after moving the received messages upstream in the protocol stack, the receiver may also release the buffers used for message queues.

Continuing to refer to FIG. 5, SD frame [6] (reference numeral 513) of the next inter-POLL message sequence (comprising SD [4:7] frames 511–514) is exemplary of a lost frame in this illustrative scenario. Upon receiving the SD frame [7] (reference numeral 514), the receiver determines that there is a mismatch of the sequence numbers and that the SD frame [6] has not been successfully transmitted for some reason. Thereafter, it sends a USTAT frame 517 to the transmitter, indicating that the SD frame [6] was lost during transmission. Responsive to another POLL frame 516, the receiver 504 sends a STAT frame 518 requesting the re-transmission of the SD frame [6]. Accordingly, the lost SD frame is re-transmitted from the transmitter 502 to the receiver 504, which is illustrated in FIG. 5 as the re-transmitted SD frame [6] (reference numeral 521).

As set forth hereinabove, a credit window is granted by the SSCOP receiver to allow the peer SSCOP transmitter to transmit new SD frames. Those skilled in the art should readily appreciate that the credit window is essentially a sliding window which is difference between the highest sequence number that the receiver can receive (VR(MR)–1) and the next in-sequence message's sequence number (VR (R)) to be received. Accordingly, in the context of congestion control within a DSLAM module (employing the B-ISDN signaling architecture) in the ADSL access network of a telecommunications network, the message flows from either the CPE units (over the UNIs) or the network-generated signaling traffic towards the DSLAM module (over the ANI) may be appropriately throttled by dynamically varying the size of the credit window granted by the DSLAM module which includes the functionality of the peer SSCOP receiver entity.

Figure 6:
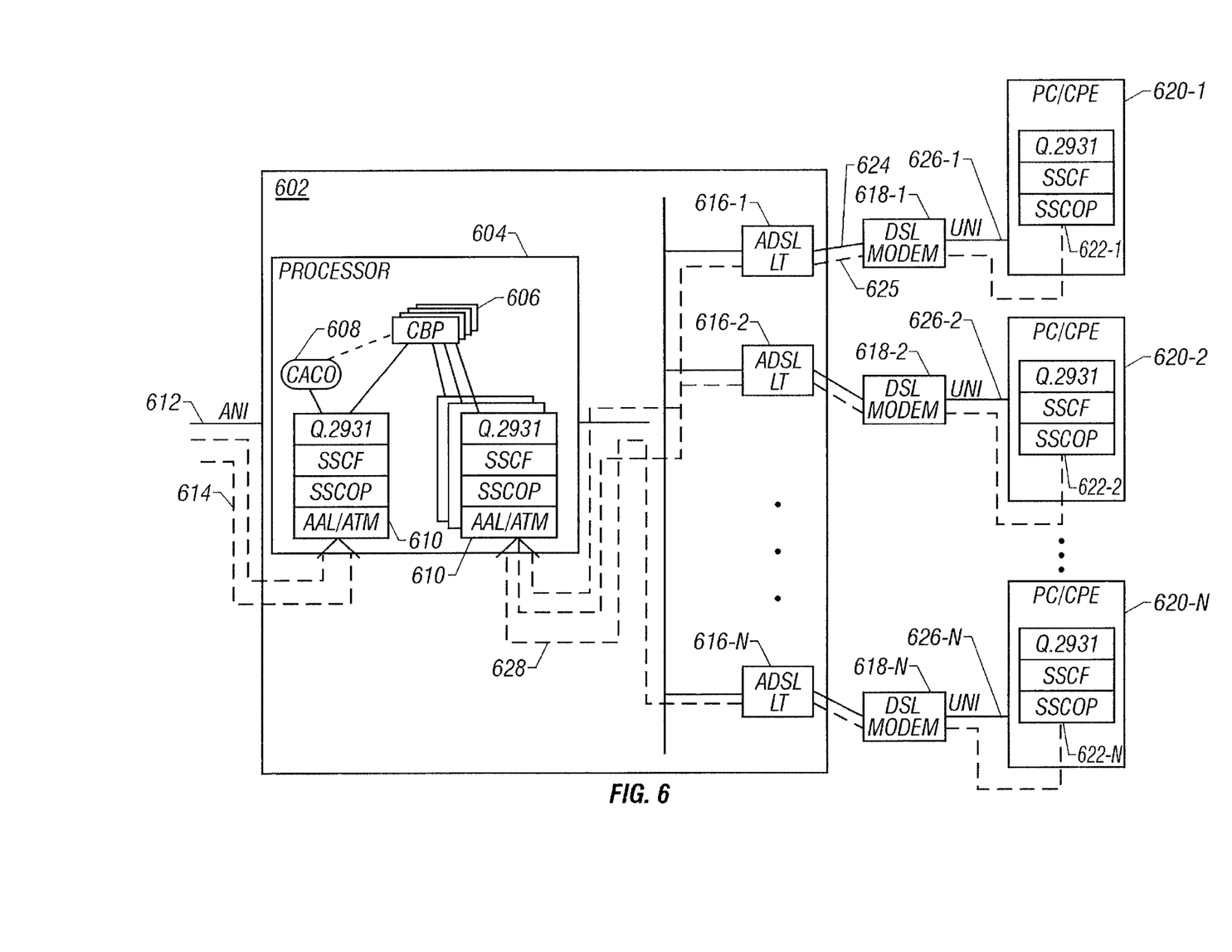
FIG. 6 depicts a block diagram of a DSLAM/ASAM module wherein a congestion control mechanism in accordance with the teachings of the present invention is provided.

Referring now to FIG. 6, depicted therein is a functional block diagram of a DSLAM/ASAM module 602 having the SSCOP functionality, wherein the congestion control mechanism of the present invention may be advantageously practiced. It should be apparent to those skilled in the art that the DSLAM module 602 is exemplary of the DSLAM modules described hereinabove with respect to the telecommunications network 100 depicted in FIGS. 1 and 2 and, accordingly, it should be understood that the DSLAM module 602 is disposed between an aggregate network portion and a distribution channel portion as set forth therein.

With respect to the distribution channel portion, the DSLAM module 602 receives control message traffic from a plurality of transmitters, that is, users exemplified as PC/CPE units 620-1 to 620-N, each of which is provided with the SAAL/SSCOP functionality (as exemplified by the protocol stacks 622-1 to 622-N) in software, hardware, firmware, or any combination thereof. Further, an appropriate UNI (reference numerals 626-1 to 626-N) is provided for each user such that a select user may transmit SSCOP messages towards the DSLAM module 602 via a DSL modem (reference numerals 618-1 to 618-N). A plurality of ADSL LT modules 616-1 to 616-N are provided in the DSLAM module 602 which connect to the physical paths (exemplified by reference numeral 624) and logical signal flow paths (exemplified by reference numeral 625) of the users. The logical signal flow paths from the UNI side are collectively labeled in the DSLAM module with reference numeral 628.

With respect to the aggregate network portion, a suitable ANI 612 is provided with the DSLAM module 602 for receiving control signal flow 614 emanating from at least a portion of the telecommunications network (e.g., an ATM switching entity, etc.) (not shown in this FIG.). A processor 604 is provided in the DSLAM module 602 for executing the various operations associated with the effectuation of the B-ISDN signaling architecture. A plurality of protocol instances, e.g., reference numeral 610, are provided for handling the SSCOP message traffic from either ANI side or the UNI side, each sharing a common buffer pool 606 for message queuing etc. A Call Control (CACO) module 608 is provided as part of the processing environment of the DSLAM module 602 for managing the overall resources of the DSLAM by making decisions with respect to establishing outgoing calls, denying incoming calls, etc.

Figure 7:
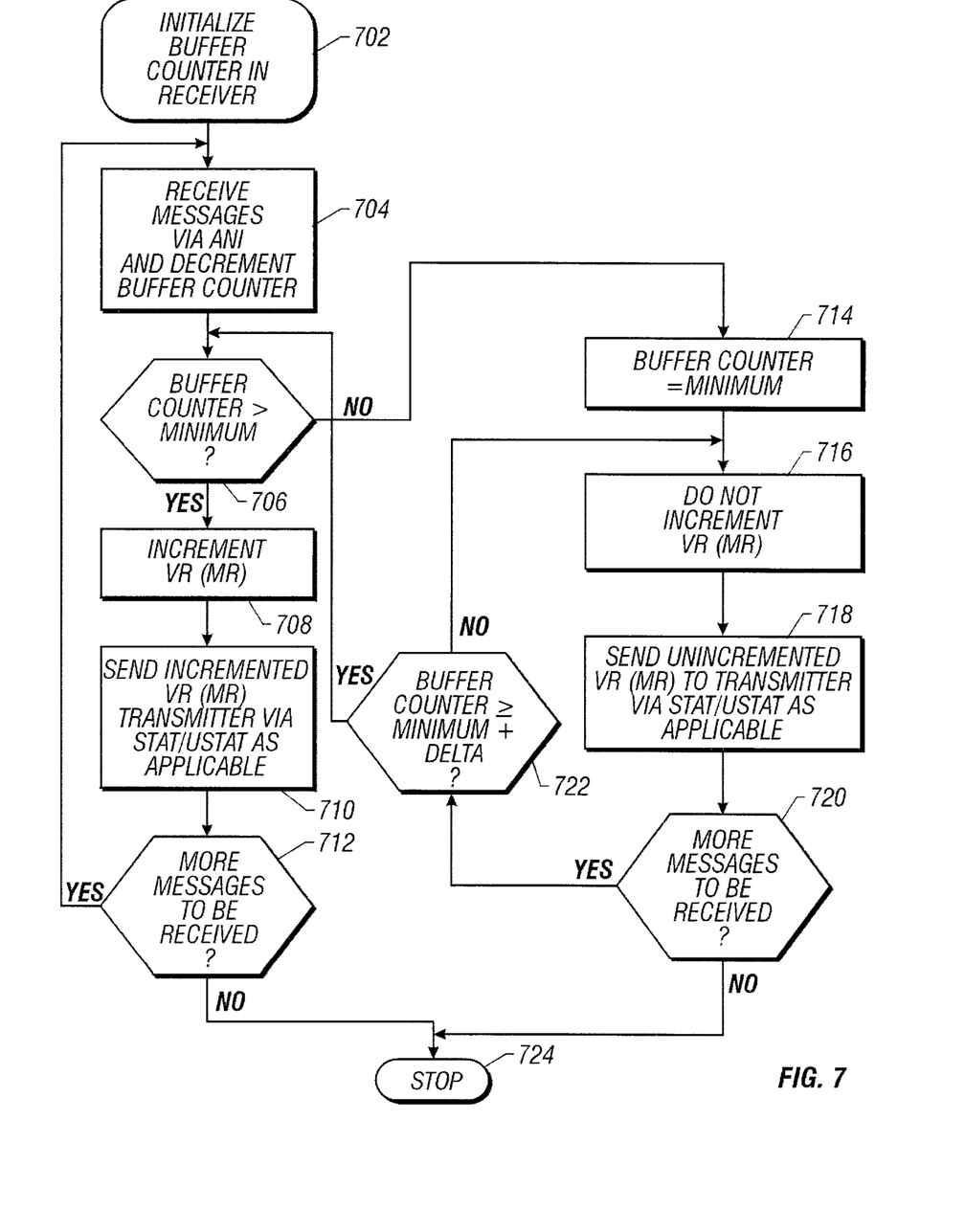
FIG. 7 is a flow chart of a congestion control method provided in accordance with the teachings of the present invention for throttling the message flows emanating from a network.

FIG. 7 is a flow chart of a congestion control method provided in accordance with the teachings of the present invention for throttling the message flow emanating from the network over an ANI. A system-wide variable, called MinAniSscopBufs, is provided for determining if the buffer usage due to the traffic received over the ANI has reached a predetermined threshold. A buffer use counter (indicating the maximum available buffer space) is initialized in the receiver (e.g., the DSLAM module 602) for monitoring the buffer usage due to the traffic (step 702). Upon receiving the incoming messages in the receiver, the buffer use counter is appropriately decremented (step 704). The contents of the buffer use counter is compared to determine if the available buffer space has reached the threshold set by the MinAniSscopBufs variable (i.e., the minimum value) (decision block 706). If the number of available buffers is greater than the MinAniSscopBufs variable, the receiver increments the VR(MR) state variable and its mapped field (i.e., N(MR)) in its STAT or USTAT PDUs (step 708) and sends the updated N(MR) information to the transmitter (i.e., network) via suitable status frames (step 710). Upon receiving the updated message sequence indicator information (VR(MR) or N(MR)) from the receiver, the transmitter accordingly transmits additional messages (i.e., SD frames) if necessary (decision block 712). Otherwise, the process stops (step 724).

On the other hand, if the buffer use counter reaches the MinAniSscopBufs variable (step 714) as determined by the decision block 706, the VR(MR) state variable is not incremented in the receiver, that is, it is held constant (step 716). The un-incremented VR(MR) is transmitted back to the network transmitter via a STAT or USTAT PDU as applicable (step 718). Accordingly, when the buffer use counter reaches a predetermined threshold value, the credit window of the transmitter is restricted, and as additional messages are received (until the difference between VR(MR)–1 and VR(R) is zero), the window keeps getting reduced because the transmitter does not send any SD PDUs that the receiver will not accept but may accept SD PDUs with lower sequence numbers.

After slowing down the message flow from the network by reducing its transmit credit window, the buffer congestion in the receiver may be unclogged because of buffer releases that occur as the messages move up the protocol stack from the queue. Accordingly, as additional messages are received (decision block 720), a determination is made if the buffer use counter regains a predetermined number of buffers (referred to as AniVrMrMax parameter or the "delta"), in addition to the MinAniSscopBufs value. If so, the VR(MR) state variable is incremented appropriately in the receiver again, as additional messages are received therein. If the buffer use counter remains less than MinAniSscopBufs+AniVrMrMax, the VR(MR) remains constant (i.e, not incremented) and, accordingly, the transmit credit window continues to be constricted.

Figure 8:
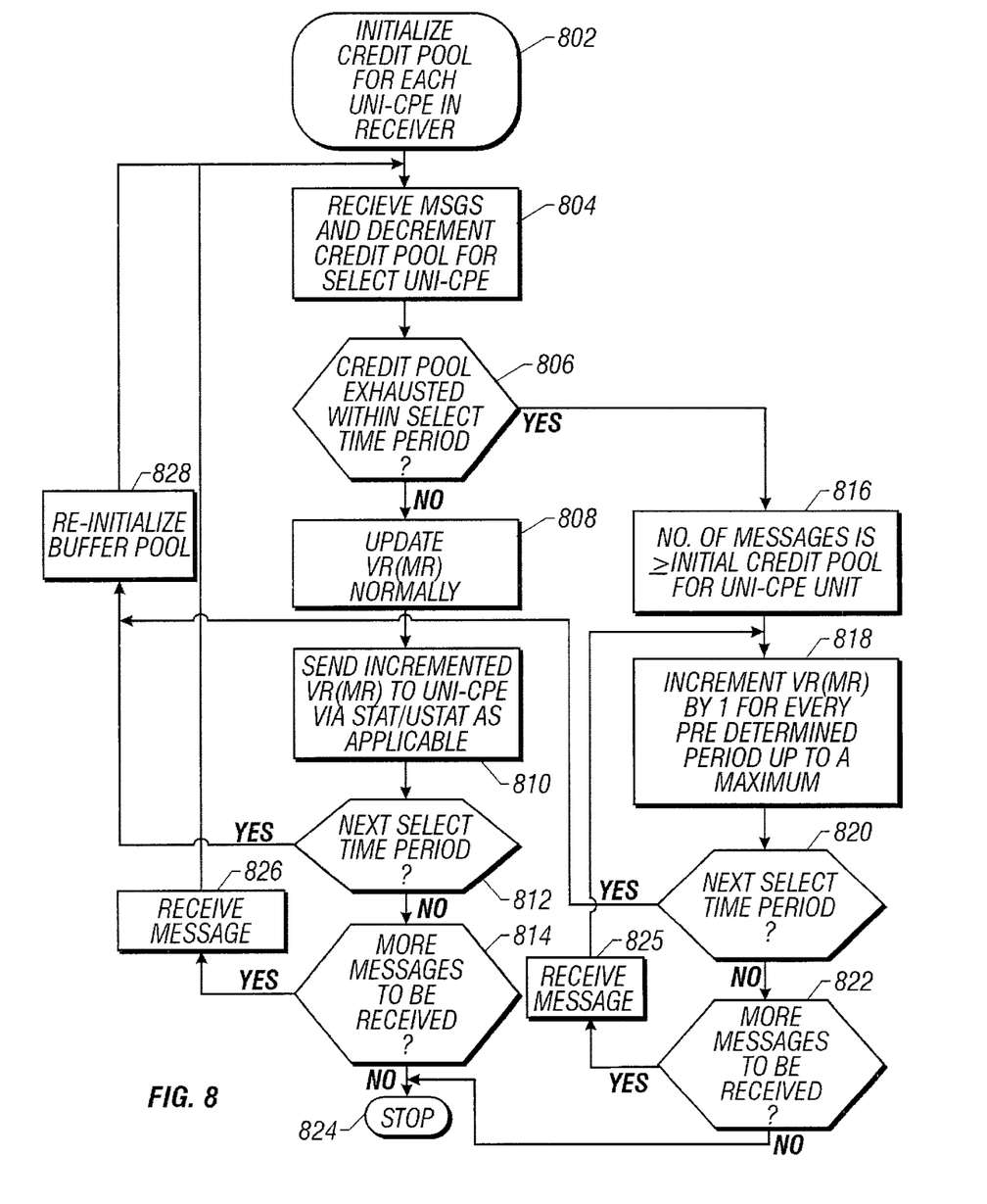
FIG. 8 is a flow chart of a congestion control method provided in accordance with the teachings of the present invention for throttling the message flows emanating from a plurality of CPE units.

FIG. 8 is a flow chart of a congestion control method provided in accordance with the teachings of the present invention for throttling the message flow emanating from a plurality of CPE/UNI units disposed on the distribution channel side of a DSLAM receiver. For each user/transmitter (i.e., the CPE/UNI unit), a credit pool is initialized in the receiver (step 802). This credit pool, denoted as UniSscopHourlyPool, indicates the number of SSCOP messages (i.e., SD PDUs) a user may send in a select time period before the user's transmit credit window is restricted by the receiver.

As messages are received in the receiver from each user, their credit pool is decremented accordingly (step 804). The number of messages received is compared against the initial credit pool to determine if a select user has exhausted its credit within the select time period (decision block 806). If not, for users remaining under the allotted credit pool, their VR(MR) state variables are updated as messages are received and placed in the signaling queue of the receiver (step 808). The incremented VR(MR) information is transmitted back to the transmitters (i.e., "behaving" users) via STAT or USTAT PDUs normally (step 810). If the select time period expires (decision block 812), the buffer credit pool is reinitialized (step 828) for the next select time period. Otherwise, additional messages are received from the behaving users (decision block 814 and step 826) until the message sequence stops (step 824).

It is possible that a select user sends more messages than is allowed by its credit pool for some legitimate reason (step 816). In that case, the user exhausts its credit pool as determined by the decision block 806 and, accordingly, the updating of its VR(MR) is throttled by the receiver as set forth below.

First, the VR(MR) state variable is incremented by an iterative factor (e.g., starting with 1) for every predetermined period (called UniNumPollExpirys) until such factor reaches a maximum (step 818). The updated VR(MR) is transmitted back to the "malfunctioning" transmitter via the N(MR) field of the STAT or USTAT frames in usual manner. If the select time period associated with the credit pool expires (decision block 820), the buffer credit pool is reinitialized (step 828) and the monitoring of incoming messages starts all over again. Otherwise, if additional messages are received and if buffers have been released due to message processing, the VR(MR) is incremented as set forth above until the maximum is reached (step 818). This procedure continues until the message sequence transfer between the transmitter and the receiver stops (step 824).

Those skilled in the art should appreciate that the per-user throttling mechanism set forth above can be implemented efficiently. Each time an SSCOP connection enters the active signaling phase, the time-stamp for the last time the credit pool was initialized may be tested. If it has been more than the select time period, the credit pool may be re-initialized and a time-stamp be placed on the connection context. When the pool reaches zero, the VR(MR) is updated every UniNumPollExpirys which can be monitored by the SSCOP timers.

Figure 9:
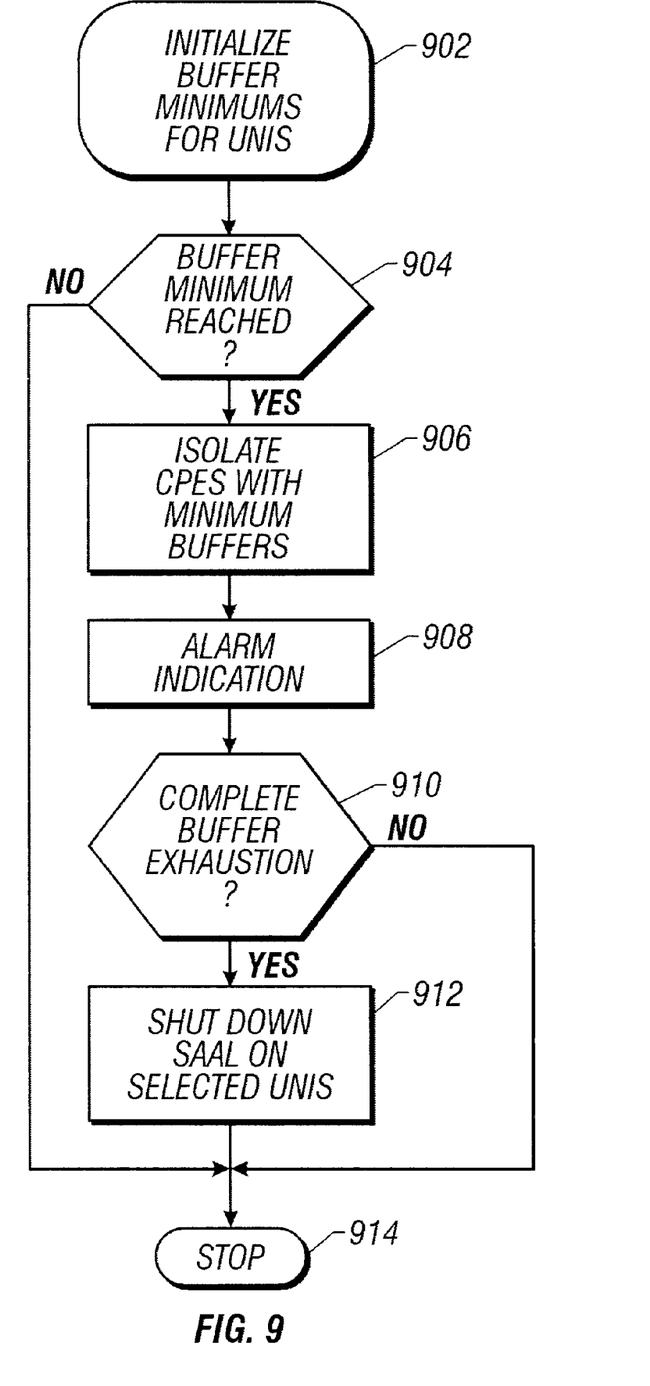
FIG. 9 is a flow chart of a method to isolate a malfunctioning/malicious CPE in accordance with the teachings of the present invention.

The per-user congestion control mechanism of the present invention can also handle users generating invalid sequences of messages on purpose (i.e., "malicious" users). FIG. 9 is a flow chart of a method to isolate a malfunctioning/malicious CPE unit in accordance with the teachings of the present invention. After initializing buffer minimums (referred to as MinUniSscopBufs) for each user (step 902), a determination is made if a select user has transmitted enough messages such that the number of available buffers reaches the MinUniSscopBufs value (decision block 904). If so, such users are isolated (step 906) and an alarm may be produced (step 908). If there is a complete buffer exhaustion (decision block 910), a shut down of SAAL on select CPE/UNIs may be effectuated (step 912).

Favorable results have been obtained by way of simulation of the congestion control mechanism described in detail hereinabove. The simulation results and the mathematical modeling of credit window size determination for a saturated transmitter and buffer usage during normal traffic are described in greater detail in the commonly assigned co-pending provisional patent application entitled: "Congestion Control Mechanism For SSCOP Protocol," Ser. No. 60/131,954, filed Apr. 30, 1999, and are incorporated by reference herein.

Based upon the foregoing Detailed Description, it should be readily apparent that the present invention provides a robust and effective congestion control mechanism for use with DSLAM modules used in ADSL access networks. The congestion control mechanism of the present invention overcomes the shortcomings and deficiencies of the state of the art by advantageously differentiating between "heavy" users and "light" users in the context of distribution side traffic. Also, transmitters of invalid message sequences are effectively isolated so as to relieve unnecessary (and illegitimate) buffer congestion at the receivers. In addition, those skilled in the art should appreciate that by throttling the incoming message flows in accordance with the teachings of the present invention, the processor resources in the DSLAM module are also conserved and fairly distributed among multiple users with disparate use patterns.

Further, it is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims. For example, although congestion caused by SSCOP signaling messages has been exemplified, the teachings of the present invention could be used for controlling congestion caused by any type of messages in a communication element. Also, the present invention may be practiced with any protocol having a transmit credit scheme for flow control between receivers and transmitters whether or not the protocol layer is centralized on a single control unit (e.g., DSLAM) with common buffers or provided on separate interface cards each with its own buffer space. Thus, the aggregate network portion of the backbone network may be implemented using any known or hitherto unknown networking technology.

Moreover, as can be readily appreciated, the congestion control schemes for the network-side traffic and the user-side traffic may be implemented either independently or together. When implemented together, it is presently preferred that the MinUniSscopBufs variable is set at a value that is lower than the value of the MinAniSscopBufs variable because malfunctioning CPEs are isolated (i.e., their VR(MR) is incremented more slowly) and the ANI is more likely to legitimately exhaust SSCOP buffers. On the other hand, by setting MinUniSscopBufs or MinAniSscopBufs to zero, one may implement either the network-side or the user-side throttle mechanism correspondingly. Accordingly, all these numerous modifications, substitutions, additions, combinations, extensions, etc. are considered to be within the ambit of the present invention whose scope is limited solely by the following claims.

What is claimed is:

1. A congestion control method for managing message flow between a transmitter and a receiver disposed in a telecommunications network, comprising the steps of:

initializing, in said receiver, a buffer count variable associated with a common buffer pool (CBP) allocated for effectuating a communication protocol in said receiver;

decrementing said buffer count variable associated with said CBP when messages are received in said receiver from said transmitter;

updating, in said receiver, a message sequence indicator as long as said buffer count variable is above a minimum value;

when said buffer counter variable reaches said minimum value, holding constant said message sequence indicator until said buffer counter variable associated with said CBP attains a predetermined value, said predetermined value is equal to said minimum value plus at least one of 16 and 32;

thereafter, updating said message sequence indicator in said receiver in response to the messages received from said transmitter;

wherein said message sequence indicator is transmitted from said receiver to said transmitter so as to dynamically control a message transmit window associated with said transmitter.

2. The congestion control method for managing message flow between a transmitter and a receiver as set forth in claim 1, wherein said step of updating is performed when a message received in said receiver moves upstream in a protocol stack associated with said communication protocol.

3. The congestion control method for managing message flow between a transmitter and a receiver as set forth in claim 2, wherein said communication protocol comprises Service Specific Connection Oriented Protocol (SSCOP) for effectuating the Signaling ATM Adaptation Layer (SAAL) standard, and further wherein said receiver comprises a Digital Subscriber Line Access Multiplexer (DSLAM) module and said transmitter comprises at least a portion of said telecommunications network.

4. The congestion control method for managing message flow between a transmitter and a receiver as set forth in claim 3, wherein said message sequence indicator is transmitted from said receiver to said transmitter via a STAT frame in response to a POLL frame from said transmitter.

5. The congestion control method for managing message flow between a transmitter and a receiver as set forth in claim 3, wherein said message sequence indicator is transmitted from said receiver to said transmitter via a USTAT frame.

6. The congestion control method for managing message flow between a transmitter and a receiver as set forth in claim 2, wherein said communication protocol comprises Service Specific Connection Oriented Protocol (SSCOP) for effectuating the SAAL standard, and further wherein said receiver receives the messages via an Access Network Interface from said transmitter, said transmitter comprising at least a portion of said telecommunications network.

7. A congestion control method for managing message flow between a receiver and a plurality of customer premises equipment (CPE) units, wherein each CPE unit is provided with a user network interface (UN1), comprising the steps of:

initializing, in the receiver, a buffer credit pool for each CPE unit said buffer credit pool corresponding to a maximum number of messages that may be transmitted by said CPE units in a first select time period said buffer credit pool being 200 and said first select time period being 1 hour;

decrementing said buffer credit pool responsive to the messages received in said receiver from a select CPE unit corresponding thereto;

if the number of messages transmitted from said select CPE unit remains below said initial buffer credit pool for said select CPE unit, incrementing a message sequence indicator in said receiver responsive to the messages sent by said select CPE unit until said buffer credit pool is re-initialized by said receiver at the expiration of said first select time period;

otherwise, if the messages transmitted from said select CPE unit exhaust said buffer credit pool for said select CPE unit, incrementing said message sequence indicator by an iterative variable, responsive to additional messages from said select CPE unit, for every second select time period, until said iterative variable reaches a maximum value, and thereafter, re-initializing said buffer credit pool by said receiver at the expiration of said first select time period; and transmitting said message sequence indicator from said receiver to said select CPE unit so as to dynamically control a message transmit window associated therewith.

8. The congestion control method for managing message flow between a receiver and a plurality of CPE units as set forth in claim 7, wherein said message sequence indicator is incremented when a received message moves upstream in a protocol stack associated with a communication protocol executed in said receiver.

9. The congestion control method for managing message flow between a receiver and a plurality of CPE units as set forth in claim 8, wherein said iterative variable is initialized to 1 and said maximum value is 2.

10. The congestion control method for managing message flow between a receiver and a plurality of CPE units as set forth in claim 8, wherein said communication protocol comprises Service Specific Connection Oriented Protocol (SSCOP) for effectuating the Signaling ATM Adaptation Layer (SAAL) standard, and further wherein said receiver comprises a Digital Subscriber Line Access Multiplexer (DSLAM) module and at least one of said CPE units comprises a computer.

11. The congestion control method for managing message flow between a receiver and a plurality of CPE units as set forth in claim 8, wherein said communication protocol comprises Service Specific Connection Oriented Protocol (SSCOP) for effectuating the SAAL standard, and further wherein said receiver comprises a DSLAM module and at least one of said CPE units comprises a set-top box used for an interactive video-on-demand service.

12. The congestion control method for managing message flow between a receiver and a plurality of customer premises equipment (CPE) units as set forth in claim 8, wherein said communication protocol comprises Service Specific Connection Oriented Protocol (SSCOP) for effectuating the SAAL standard, and further wherein said message sequence indicator is transmitted from said receiver to each select CPE unit via a STAT frame in response to a POLL frame from said select CPE unit.

13. The congestion control method for managing message flow between a receiver and a plurality of customer premises equipment (CPE) units as set forth in claim 8, wherein said communication protocol comprises Service Specific Connection Oriented Protocol (SSCOP) for effectuating the SAAL standard, and further wherein said message sequence indicator is transmitted from said receiver to each select CPE unit via a USTAT frame.

* * * * *